May 1, 1956

J. J. BARBER 2,744,177

LIQUID LEVEL SIGNALLING DEVICE

Filed Aug. 6, 1952

INVENTOR.
John J. Barber
BY
*Will, Mackey + Burdew.*
HIS ATTORNEYS

May 1, 1956  J. J. BARBER  2,744,177
LIQUID LEVEL SIGNALLING DEVICE
Filed Aug. 6, 1952  3 Sheets-Sheet 2
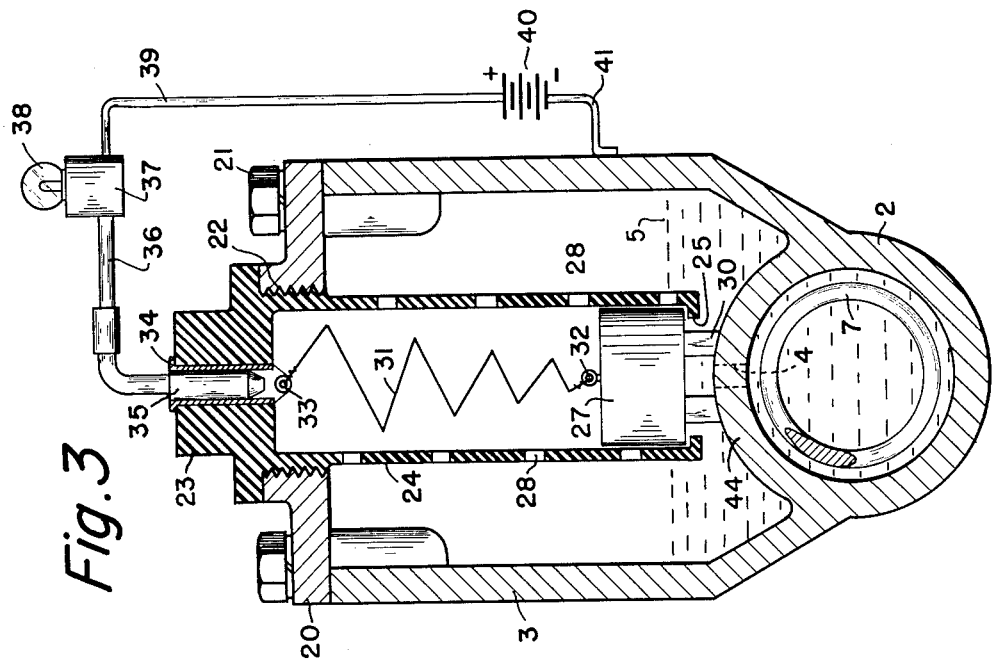
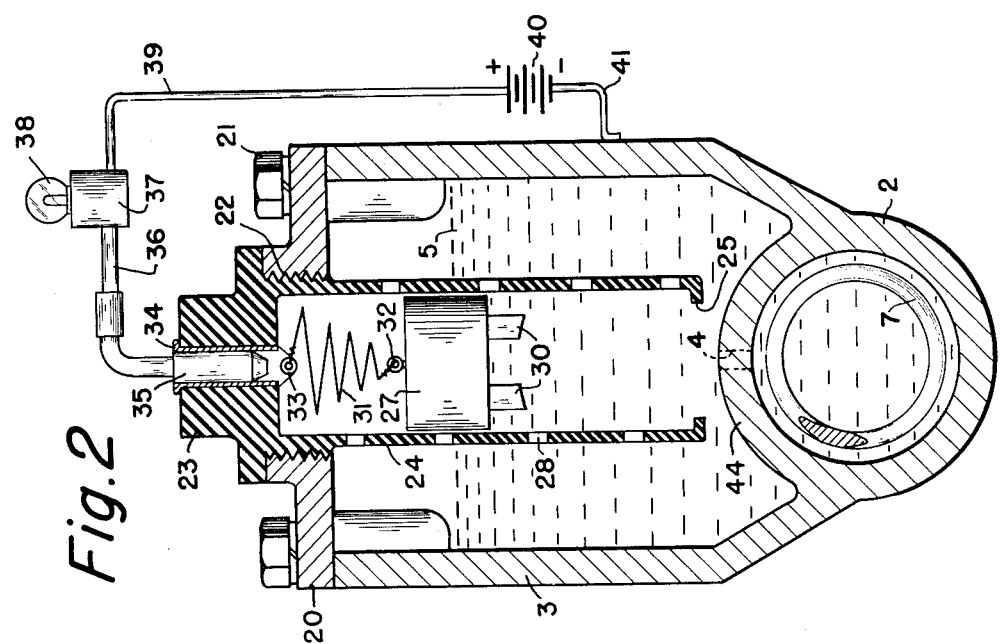
INVENTOR.
John J. Barber
BY
*Willey, Mackey & Bender*
HIS ATTORNEYS

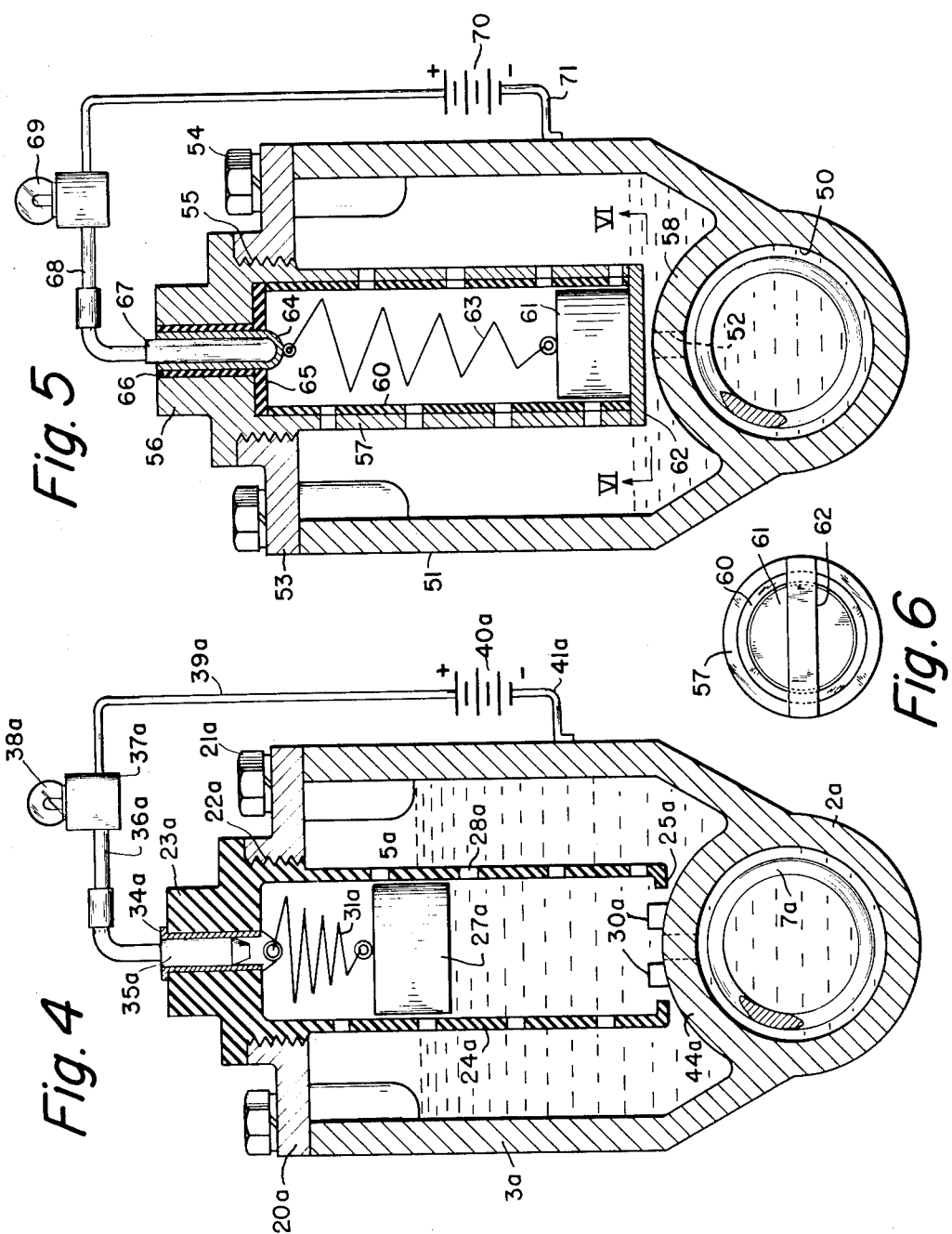

United States Patent Office 2,744,177
Patented May 1, 1956

2,744,177
LIQUID LEVEL SIGNALLING DEVICE

John J. Barber, Scottdale, Pa., assignor to Knock A Bar, Inc., Pittsburgh, Pa., a corporation of Pennsylvania Application August 6, 1952, Serial No. 302,931

4 Claims. (Cl. 200—84)

This invention relates to a liquid level signalling device in which the signalling device operates to give a warning when the liquid in a container drops to a predetermined level. One application of the invention is in connection with a fluid brake system of a vehicle in which oil or other liquid is supplied from a container or reservoir to a master cylinder containing a piston which is operable to force the oil from the master cylinder into the brake cylinders of the vehicle. Oil is fed from a container to the master cylinder to replace that which is lost during operation. It is desirable to know when the oil in the chamber reaches a predetermined low level so that it may be replenished.

In accordance with the present invention, the container is provided with a float which is connected in an electric circuit with a signalling device such as a lamp or buzzer, the circuit being normally open but being closed when the float drops to a predetermined low level and engages an electric contact which completes the electric circuit. A magnet is provided for urging the float into engagement with the electric contact which completes the circuit and for maintaining it in engagement with that contact until the contact or engagement is broken by manual means. The magnet insures positive engagement of the float with the electrical contact which completes the circuit, thereby insuring that the signalling device will operate continuously until the float has been disengaged manually from its electric contact and the oil in the container has been replenished.

Referring more particularly to the accompanying drawings which illustrate several embodiments of my invention, Figure 1 is a view partly in side elevation and partly in section illustrating my invention and including the electric circuit;

Figure 2 is an enlarged vertical section taken on the line II—II of Figure 1, showing the float in raised position and the electric circuit open;

Figure 3 is a view similar to Figure 2, but showing the float in a lowered position with the electric circuit closed;

Figure 4 is a view similar to Figure 2, but showing an embodiment in which the magnets are mounted on the container instead of on the float;

Figure 5 is a view similar to Figure 3, but illustrating a modification in which the magnet is secured to the lower end of the tube instead of to the float or to the container; and Figure 6 is a section taken on the line VI—VI of Figure 5.

Figure 1:
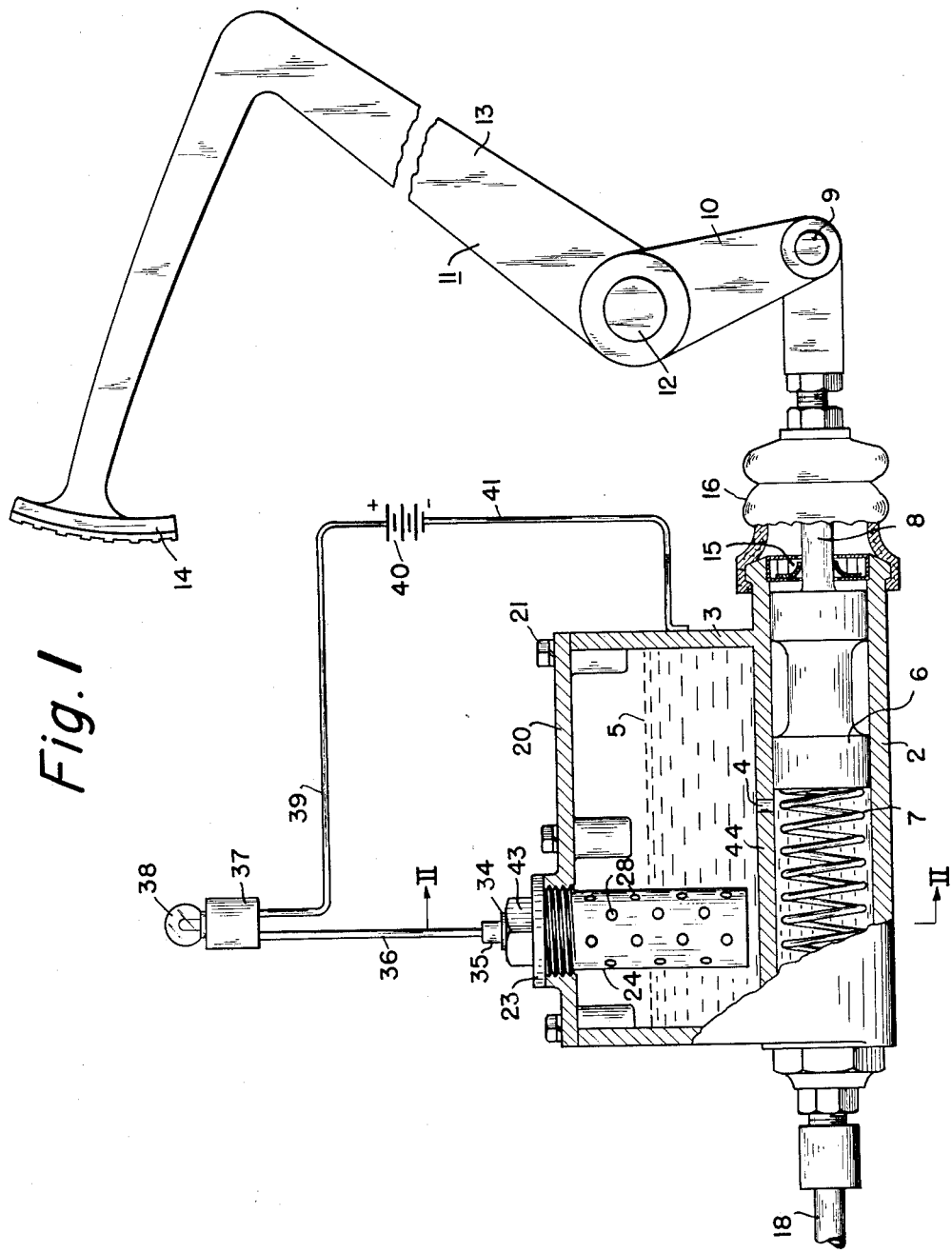

Referring more particularly to the accompanying drawings, the device comprises a master cylinder 2 of a fluid brake system and a container or oil reservoir 3 mounted on the master cylinder and provided with an opening 4 for supplying oil 5 from the container to the cylinder. The cylinder 2 contains a piston 6 and a spring 7 interposed between the end of the piston and an end of the cylinder. A piston rod 8 is pivoted at 9 to arm 10 of a lever 11 which is pivoted at 12. The other arm 13 of the lever 11 is provided at its end with a foot pedal 14. The piston rod 8 extends through a seal 15 at the end of cylinder 2 and through a bellows-like protective housing 16. All of the structure thus far described is well-known and need not be described in further detail. Pressure exerted on the foot pedal moves the piston 6 to the left as viewed in Figure 1, against the pressure of spring 7, and forces the oil through a conduit 18 to the various brake cylinders.

The container 3 is made of iron, steel or other electrically conducting material. The top of the container is closed by a cover 20 secured thereto by bolts 21. The cover 20 has a filling opening 22 which is internally threaded and which is closed by an externally threaded closure plug designated generally by reference numeral 23. A tube 24 which may be integral with or connected to the plug 23 extends downwardly into the container 3 and has an open end at its bottom which lies adjacent the bottom of the container. The plug and tube are made of electrically insulating material. The lower end of the tube is provided with an inturned flange 25 for a purpose hereinafter described. A float 27 made of electrically conducting material is movable upwardly and downwardly within the tube 24 in accordance with the level of the liquid in the container. The wall of the tube is provided with openings 28 so that the level of the liquid inside and outside of the tube is substantially the same. Two magnets 30 are secured to the bottom of the float. A wire coil 31 is secured at one end to a pin 32 mounted on the float, the other end of the coil 31 being connected at 33 to a female electrical connector or jack 34 supported in the closure plug 23. A male electrical connector or plug 35 fits into the connector 34. The plug 35 is connected by a wire 36 to a lamp socket 37 which may be mounted on the instrument panel of the vehicle. A lamp 38 is screwed into the socket 37. The socket is connected by a wire 39 to one terminal of a battery 40 or other source of electric current. The other terminal of the battery is connected by a wire 41 to the container 3. The closure plug 23 is formed with flat surfaces 43 adapted to be gripped by a wrench so that the closure plug 23 and tube 24 can be unscrewed from the container in order to add oil as needed.

The electric circuit including the signal lamp 38 is normally open due to the space between the float 27 and the bottom wall 44 of the container 3. When the oil in the container drops to a predetermined low level, the magnets 30 on the float are drawn into engagement with the wall 44 of the container. The magnets will make good contact with the wall 44 even though there is a layer of sludge on the wall and the magnets will be maintained in contact with the wall until the float is disengaged manually from the wall. Upon contact of the magnets 30 with the wall 44 of the container, the electric circuit including the signal lamp 38 is completed and the lamp lights, calling the attention of the operator to the fact that the oil in the container should be replenished. Upon closing of the electric circuit, the current flows from the battery 40 through wire 41 to the container 3 to wall 44. It then flows through magnets 30, float 27, wire coil 31, electrical connectors 34 and 35, wire 36, socket 37, lamp 38, and wire 39 back to the battery.

Plug 35 is withdrawn from connector 34. Plug 23 and tube 24 are unscrewed from the filling opening and raised from the container 3. The flange 25 on the lower end of the tube engages the float and lifts it from engagement with the wall 44 when the tube is raised. The oil in the container is then replenished.

The construction and operation of the embodiment shown in Figure 4 is the same as that shown in Figures 1–3 except that the magnets 30a are secured to the lower wall 44a of the container 3a instead of being secured to the float 27a.

Referring to the embodiment shown in Figures 5 and 6, the master cylinder 50 has an oil container 51 mounted thereon from which oil is supplied to the cylinder through an opening 52. The container 51 has a cover 53 secured thereto by bolts 54 and is provided with a filling opening 55 which is internally threaded and receives external threads on a closure plug 56. The plug 56 has an outer tube 57 which is open at its bottom and extends to a point adjacent the bottom wall 58 of the container. The container 51, closure plug 56 and outer tube 57 are made of electrically conducting material. An inner tube 60 of electrically insulating material fits within the outer tube 57. A float 61 is movable upwardly and downwardly within the inner tube 60. A magnet bar 62 extends across the open ends of the tubes 57 and 60 and is secured to the tube 57. A wire spring 63 is connected to the float 61 which is made of electrically conducting material and to a female electrical conductor 64 mounted in the plug 56 but insulated therefrom by an insulating disc 65 through which the end of the connector 64 extends and by an insulating sleeve 66. The connector 64 receives a male connector 67 which is connected by a wire 68 in circuit with a lamp 69 to one terminal of a battery 70. The other terminal of the battery is connected by wire 71 to the container 51.

When the oil in the container sinks to a predetermined low level, the magnet 62 draws the float 61 into engagement with it and maintains it in such engagement. Electric current then flows from battery 70 through wire 71, cointainer 51, cover 53, plug 56, tube 57, magnet 62, float 61, wire 63, connectors 64 and 67, wire 68, lamp 69, back to the battery, thus lighting the lamp. The lamp remains lighted until connectors 64 and 67 are disconnected. The closure plug 56 is then unscrewed from the filling opening and the plug, together with tubes 57 and 60, magnet 62 and float 61, are withdrawn from the container. The float is then manually disengaged from the magnet, the oil in the container is replenished, and the closure plug 56 and the parts connected to it are again reinserted in the container.

The provision of a magnet for urging the float into engagement with an electrical contact for closing an electric circuit including a signalling device, insures good and continuous engagement of the float with the electrical contact, thereby insuring continuous operation of the signalling device until the float is disengaged manually from its electrical contact. Also, the magnet insures good and continuous engagement of the float with its electrical contact even through a layer of sludge on the electrical contact, thus insuring proper operation of the signalling device when the liquid in the container has reached the predetermined low level.

The invention is not limited to the preferred embodiments, but may be otherwise embodied or practiced within the scope of the following claims.

I claim:

1. A float-operated, unidirectional switching means including a substantially closed, electro-conducting container having a filling opening, liquid in the container, an electrical insulating plug closing the filling opening and having an electrical insulating tube extending into the liquid and terminating adjacent the bottom of the container, a permanent magnetic float within the tube adapted to ride substantially on the liquid, said magnetic float being of sufficient strength to resist the buoyancy of the liquid at any level after once making contact with the container, an inwardly turned flange on the tube adapted to engage the float, and an extensible conductor fixed to the magnetic float and passing through the plug, said conductor and container being adapted for connection to an electrical circuit whereby upon lowering the level of the liquid, the magnetic float contacts the container to close the circuit which thereafter remains closed regardless of any subsequent liquid level until the plug is lifted to engage the flange with the float and thereby lift the float also.

2. A float-operated, unidirectional switching means actuated by a predetermined minimum liquid level including a substantially closed, electro-conducting container having a filling opening, liquid in the container, an electrical insulating plug closing the filling opening, an electrical insulating tube extending from the plug into the liquid and terminating adjacent the bottom of the container in an inwardly turned flange, a permanent magnetic float within the tube adapted to ride substantially on the liquid and engageable with the flange of the tube, said magnetic float being of sufficient strength to resist the buoyancy of the liquid at any level after once making contact with the container, a conductor extending through the plug, a wire coil joining the conductor to the permanent magnet, a second conductor fixed to the container, both of said conductors being adapted for connection to an electrical circuit whereby upon lowering the level of the liquid, the magnetic float contacts the container to close the circuit which thereafter remains closed regardless of any subsequent liquid level until the plug is lifted to engage the flange with the float and thereby lift the float also.

3. A float-operated, unidirectional switching means including a substantially closed, electro-conducting container having a filling opening, liquid in the container, an electro-conducting plug closing the filling opening, an electro-conducting outer tube connected to the plug and terminating in an open end adjacent the bottom of the container, an electrical insulating inner tube concentric with the outer tube, a magnetic plate secured to the outer tube and extending across the inner tube, a float in the inner tube adapted to ride substantially on the liquid, said magnetic plate being of sufficient strength to cause the float to resist the buoyancy of the liquid at any level after once making contact therewith, and an extensible conductor fixed to the magnetic float and passing through the plug, said conductor and container being adapted for connection to an electrical circuit whereby upon lowering the level of the liquid, the float contacts the magnet to close the circuit which thereafter remains closed regardless of any subsequent liquid level until the plug and tubes are removed from the container and the magnetic seal between the float and magnet manually broken.

4. Switching means including a container for holding a liquid, a tube stationed within the container, a magnetic float stationed within the tube and adapted to ride substantially upon the liquid, said magnetic float being of sufficient strength to resist the rise of said liquid after once making contact with the container, said magnetic float including an electro-conducting float member having a magnet in the form of a downwardly projecting prong whereby the magnet can penetrate sludge and the like in the container and provide good contact therewith, and electro-conducting means adapted to join the float and container to an electrical circuit whereby upon lowering the level of the liquid, the magnetic float contacts the container to close the circuit and remains adhered to the container until manually removed.

References Cited in the file of this patent

UNITED STATES PATENTS

| 1,995,895 | Parks | Mar. 26, 1935 |
| 2,120,825 | Wolfert | June 14, 1938 |
| 2,161,441 | Vickers | June 6, 1939 |
| 2,264,058 | Vigren et al. | Nov. 25, 1941 |
| 2,464,886 | O'Reilly | Mar. 22, 1949 |
| 2,586,449 | Whitten | Feb. 19, 1952 |
| 2,613,294 | McNea | Oct. 7, 1952 |
| 2,615,105 | Whitney | Oct. 21, 1952 |
| 2,622,163 | Snell | Dec. 16, 1952 |

FOREIGN PATENTS

| 478,784 | France | Oct. 11, 1915 |